(No Model.)

L. SUTHERLAND.
THILL COUPLING.

No. 370,905.  Patented Oct. 4, 1887.

WITNESSES.
Wm. A. Leonard.
Charles L. Thurber.

INVENTOR.
Levi Sutherland,
PER
C. Bradford.
ATTORNEY.

UNITED STATES PATENT OFFICE.

LEVI SUTHERLAND, OF INDIANAPOLIS, INDIANA.

THILL-COUPLING.

SPECIFICATION forming part of Letters Patent No. 370,905, dated October 4, 1887.

Application filed June 18, 1887. Serial No. 241,724. (No model.)

*To all whom it may concern:*

Be it known that I, LEVI SUTHERLAND, of the city of Indianapolis, county of Marion, and State of Indiana, have invented certain new and useful Improvements in Couplings for Poles and Shafts, of which the following is a specification.

The object of my said invention is to provide a "jack-clip" or coupling between the axle and pole or shafts of a vehicle which will have a greater wearing-surface, and consequently be less liable to get loose and rattle, than those of the ordinary construction.

The invention consists in forming a bearing in the portion secured to the axle and a T-shaped head on the portion secured to the shafts, and also in some details of construction, as will be hereinafter more particularly described.

Figure 1:
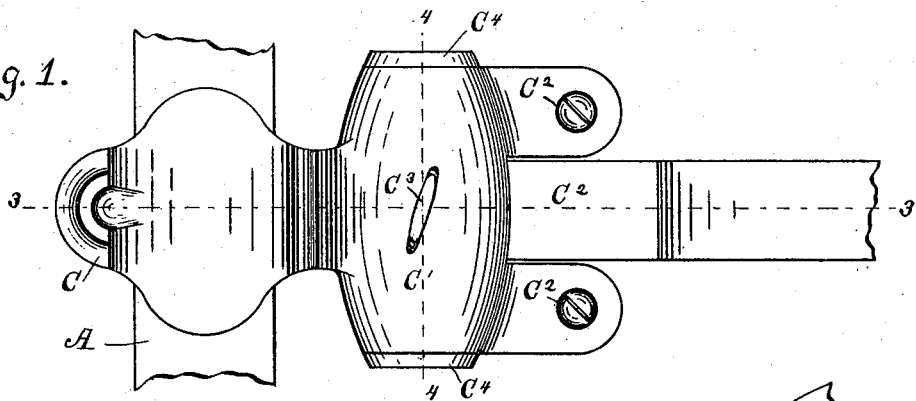
Figure 2:
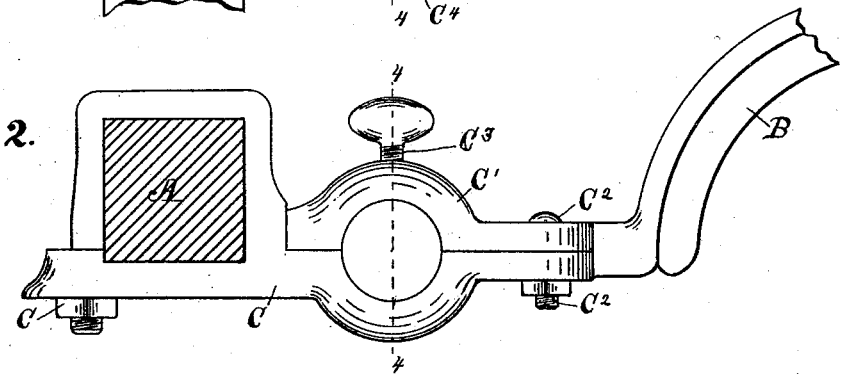
Figure 3:
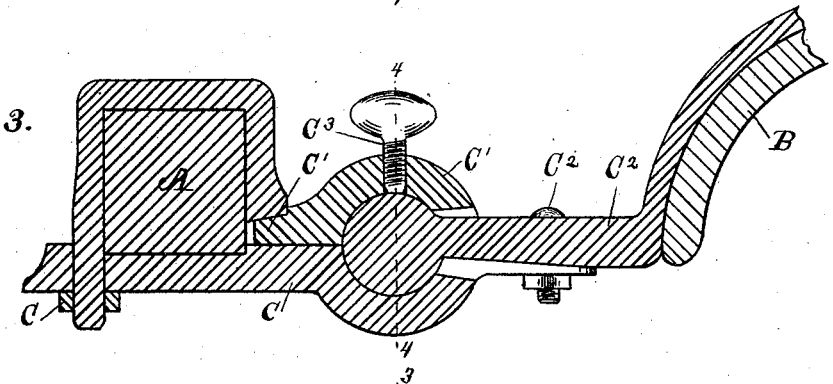

Referring to the accompanying drawings, which are made a part hereof, and on which similar letters of reference indicate similar parts, Figure 1 is a top or plan view of a coupling embodying my said invention; Fig. 2, a side elevation thereof; Fig. 3, a longitudinal vertical section on the dotted line 3 3; and Fig. 4 a transverse vertical section, looking toward the left from the dotted line 4 4.

In said drawings, the portions marked A represent the axle of the vehicle, B a fragment of the shaft or pole thereto, and C C' C² the several portions of my improved jack-clip or coupling.

The axle A and shaft B are or may be any ordinary axle and shaft, and need no special description.

The portion C of the jack-clip is the portion secured to the axle. Its main part extends underneath the axle and out in front to form the lower part of the bearing for the portion C², and preferably has a portion which extends up over and around the axle and down through a hole in its extreme rear end, upon the lower end of which is a nut, c. When the axle is inserted and this nut turned up, the clip is secured firmly upon the axle. The part which passes over the top of the axle may be separate from the part C, however, if desired, without departing from the other features of my invention.

Figure 4:
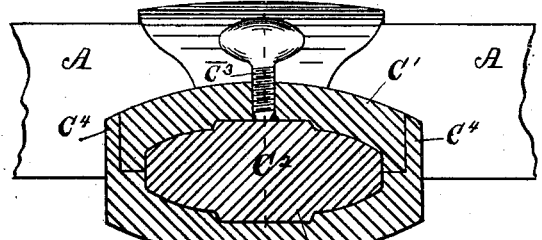

The cap C' forms the upper portion of the bearing for the part C², and has a lip, c', which extends into an opening or mortise in the front side of that portion of the part C which extends up over the axle. It has ears on its front side corresponding to similar ears on the part C, to which they are secured by bolts c², as shown. A set-screw, c³, is inserted in this cap, which may be screwed down against the portion of the part C² which rests in the bearing, when necessary, and thus take up any lost motion which may exist in said bearing by reason of wear or otherwise. In order to secure this cap C' more firmly in position, and also to preclude the entrance of any dust or dirt to the bearing, I prefer to extend up from the part C at the ends of said part flanges c⁴, which are finished off smooth with the upper surface of the part C', and thus form complete caps for the ends of the device, as shown. The part C², as before stated, has a T-head, which rests in a bearing formed between the parts C and C'. This may be a plain straight T-head, but is preferably approximately of an egg-shape form in general outline, as indicated in Fig. 4, although this is not essential. It is also, preferably, quite large, in order to give a considerable bearing-surface, and thus decrease the wear at any particular point. It extends forward and is connected to the shaft or pole B in the usual manner.

Having thus fully described my said invention, what I claim as new, and desire to secure by Letters Patent, is—

1. The combination, in a coupling for poles or shafts, of a main portion, C, attached to the axle at one end and formed with a half journal-bearing on its other, a part, C', forming the other part of the journal-bearing, secured on said part C, and provided with a set-screw adapted to bear against the journal mounted in said bearing, and the part C², formed with a journal mounted between said parts C and C' in said bearing, all substantially as set forth.

2. A coupling for the axle and pole or shafts of vehicles, consisting of a main portion, a cap, and a T-shaped part secured in a bearing between them, one of said parts having flanges c⁴, which extend over the ends of the other, substantially as shown and described.

3. The combination, in a coupling for the axle and pole or shafts of vehicles, of the main part secured to the axle, and having an orifice or mortise in the portion which surrounds the axle, and ears extending forward from its front side, a cap having a projection which enters said orifice, and corresponding ears and bolts which pass through said ears and secure the parts together, substantially as shown and described.

4. The combination, in a coupling for the axle and pole or shafts of vehicles, of the main portion secured to the axle, the part which surrounds the axle being formed in one piece therewith and extending up around the axle and down through an opening in its extreme rear end, where it is secured by a single nut, and having a portion extending forward and forming the lower part of a bearing for the portion secured to the shafts or pole, a cap forming the upper portion of said bearing, and said part secured to the shafts or pole mounted in said bearing, substantially as shown and described.

In witness whereof I have hereunto set my hand and seal, at Indianapolis, Indiana, this 13th day of June, A. D. 1887.

LEVI SUTHERLAND. [L. S.]

In presence of—
 C. BRADFORD,
 CHARLES L. THURBER.